United States Patent [19]

Kirchhöfer

[11] Patent Number: 4,925,647

[45] Date of Patent: May 15, 1990

[54] PROCESS FOR THE PRODUCTION OF METAL OXIDES OR METAL MIXED OXIDES

[75] Inventor: Hermann Kirchhöfer, Niedernberg, Fed. Rep. of Germany

[73] Assignee: Hoechst Aktiengesellschaft, Frankfurt am Main, Fed. Rep. of Germany

[21] Appl. No.: 99,909

[22] Filed: Sep. 22, 1987

[30] Foreign Application Priority Data

Sep. 24, 1986 [DE] Fed. Rep. of Germany ....... 3632396

[51] Int. Cl.$^5$ ............................................. C01B 13/14
[52] U.S. Cl. .................................... 423/592; 423/593; 501/12
[58] Field of Search ............... 423/275, 599, 601, 592, 423/605, 594, 604, 595, 632, 596, 617, 598, 643, 600, 603, 606, 618, 607, 622, 608, 624, 619, 631, 639, 593; 501/103, 104, 126, 134, 136, 152, 153, 12; 204/157.42

[56] References Cited

U.S. PATENT DOCUMENTS

| | | | |
|---|---|---|---|
| 1,333,020 | 3/1920 | Halvorsen | 423/631 |
| 1,507,993 | 9/1924 | Falck et al. | 423/631 |
| 1,652,119 | 12/1927 | Halvorsen et al. | 423/631 |
| 2,667,404 | 1/1954 | Haensel | 423/631 |
| 2,737,444 | 3/1956 | Fisher et al. | 423/631 |
| 3,222,231 | 12/1963 | Markels et al. | 204/157.42 |
| 3,290,122 | 12/1966 | Clinton et al. | 264/9 |
| 3,397,257 | 8/1968 | Brambilla et al. | 264/0.5 |
| 3,908,904 | 9/1975 | Kerner et al. | 423/540 |
| 3,933,679 | 1/1976 | Weitzel | 252/301.1 |
| 4,018,881 | 4/1977 | Mattox | 423/631 |
| 4,043,507 | 8/1977 | Wace | 239/102 |
| 4,060,497 | 11/1977 | Huschka et al. | 252/301.1 S |
| 4,102,651 | 7/1978 | Kerner et al. | 423/540 |
| 4,337,896 | 7/1982 | Berger et al. | 239/102.2 |
| 4,431,164 | 2/1984 | Jungo et al. | 252/628 |
| 4,465,234 | 8/1984 | Maehara et al. | 239/102.2 |
| 4,723,708 | 2/1988 | Berger et al. | 239/102.2 |
| 4,742,810 | 5/1988 | Anders et al. | 239/102.2 |

FOREIGN PATENT DOCUMENTS 1212841 11/1966 Fed. Rep. of Germany .
2459445 7/1976 Fed. Rep. of Germany .
3035331 4/1982 Fed. Rep. of Germany .

OTHER PUBLICATIONS

"Formation Mechanism of Ultrafine Alumina Particles from NH$_4$ gas–AlCl$_3$ Solution", Takase et al., Research Laboratory of Engineering Materials, 87'10]1979, pp. 495–500.
"Preparation of Ultrafine Particles of Alumina Gel from Colloidal Solution of Aluminum Hydroxide", Takase et al., Research Laboratory of Engineering Materials [6–5–1978], pp. 506–508.
Physics for Students of Science and Engineering, John Wiley & Sons, Inc., N.Y., 1963, pp. 429–437.

Primary Examiner—Robert L. Stoll
Assistant Examiner—Paige C. Harvey
Attorney, Agent, or Firm—Foley & Lardner, Schwartz, Jeffery, Schwaab, Mack, Blumenthal & Evans

[57] ABSTRACT

A process for the production of a metal oxide or metal mixed oxide is described, in which an aqueous solution of at least one water-soluble salt-like compound of a polyvalent metal is finely divided in an inert gas atmosphere. The droplets which are obtained are brought into contact with a gas containing ammonia, until such time as the hydroxide (the hydroxides) of the polyvalent metal (metals) is (are) at least partially precipitated, and the small gel spherules, which contain metal hydroxide and water, are collected. In this process, the aqueous solution which is employed is finely divided by ultrasonic waves. An intergas laminar flow which is oriented parallel to the outlet direction of the solution, is generated radially symmetrically about the outlet aperture for the solution, and the solidified get spherules are dried and converted, by heating, into the metal oxide or metal mixed oxide.

20 Claims, 2 Drawing Sheets

PROCESS FOR THE PRODUCTION OF METAL OXIDES OR METAL MIXED OXIDES

BACKGROUND OF THE INVENTION

The present invention relates to a process for the production of powders of metal oxides or metal mixed oxides with excellent fluidity and high bulk density. In this process, metal salt solutions are broken down, with the application of ultrasonic waves, into fine droplets, which are then converted into stable metal hydroxide gel particles in an atmosphere of ammonia gas. These solidified gel particles are collected and, after drying, are converted into the corresponding metal oxides or metal mixed oxides.

It is already known (German Auslegeschrift No. 2,459,445) to break down thorium or uranium salt solutions, by means of a liquid jet displaced into oscillation, into fine drops, and then to partially solidify these drops by precipitation of the hydroxides in an atmosphere of ammonia gas, before they penetrate into an ammonia solution. The spherules converted into the oxides have diameters of 200–500 μm.

According to another process (German Offenlegungsschrift No. 3,035,331), spherical particles which are especially suitable for use in nuclear technology may be produced with diameters between 50 and 2500 μm and a narrow grain spectrum. In this process, solutions or melts are converted, by means of a vibrator system at frequencies of 50–2500 Hz, into drops which are subsequently solidified chemically or physically to form spherical particles. The drop or particle size is dependent upon the frequency of the vibrator and the throughput rate of the liquid.

Other processes are also known for the solidification of the droplets, in which processes the drops are solidified either by dehydration (sol-gel process according to U.S. patent specification No. 3,290,122) or by reaction of polymeric additives with an alkaline medium (German Patent Specification No. 1,212,841). A feature common to all these processes is the introduction of the - in part already "presolidified" - drops into a fluid phase, in which the solidification is then completed.

All these processes exhibit disadvantages which reside in the attainable minimum grain size (grain sizes representing diameters of only a few μm cannot be produced), the relatively broad grain spectrum or in the interposition of, in most cases, organic barrier liquids, on passing through which the drops can absorb extraneous substances, which thus pass into the products. Moreover, these—in most cases organic—phases are consumed by processes of adsorption at the drops, so that they must constantly be renewed. A further disadvantage in the application of fluid barrier phases consists in the water enrichment, proceeding together with the dehydration in the drop, in the alkaline phase. In order to be able to operate the process over a longer period of time under constant conditions, it is necessary to provide regeneration circuits, in which the proportion of water is again reduced.

SUMMARY OF THE INVENTION

The object of the present invention is to produce substances with a very small grain diameter and narrow grain spectrum, and to collect the spherical particles which are produced without the interposition of a fluid phase. It is intended at the same time that the regeneration circuits, which are costly in terms of process technology, should be avoided, and that a high liquid throughput should be attainable.

A process for the production of a metal oxide or metal mixed oxide has now been found, in which an aqueous solution of at least one water-soluble, salt-like compound of a polyvalent metal is finely divided in an inert gas atmosphere, the droplets obtained are brought into contact with a gas containing ammonia until such time as the hydroxide (the hydroxides) of the polyvalent metal (metals) is (are) at least partially precipitated, and the small gel spherules which are produced and which contain metal hydroxide and water, are collected, wherein the aqueous solution employed is finely divided by means of ultrasonic waves, an inert gas laminar flow which is oriented parallel to the outlet direction of the solution is generated radially symmetrically about the outlet aperture for the solution, and the solidified gel spherules are dried and converted, by heating, into the metal oxide or metal mixed oxide.

BRIEF DESCRIPTION OF THE DRAWINGS

FIG. 3 shows an axial projection of the container (in FIGS. 1 and 2), with the direction of view from below onto the container.

DESCRIPTION OF THE PREFERRED EMBODIMENTS

Figure 1:
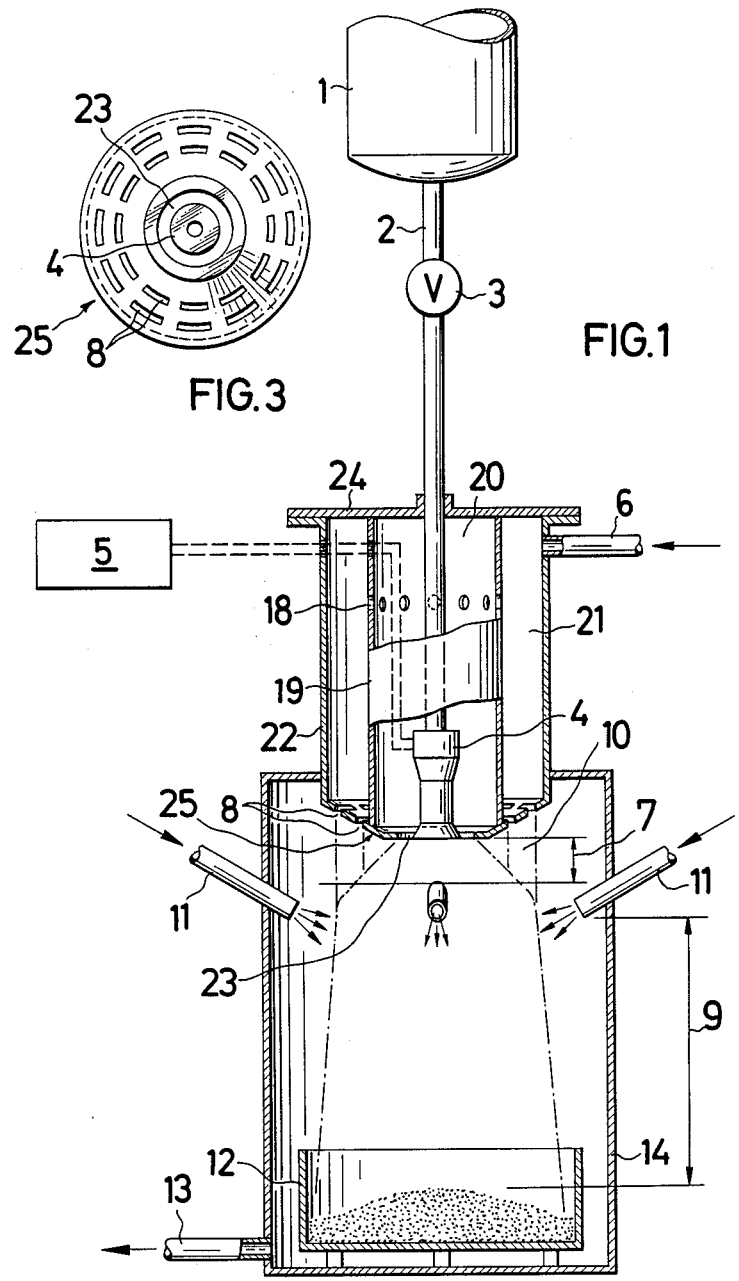
FIG. 1 shows a device in which the metal salt solution is broken down into fine droplets by means of an ultrasonic atomizer.

On account of the high frequency (at least 19 kHz) and sound intensity (approximately 10 W/cm$^2$) of the ultrasonic waves which are employed, the oscillatory movements of the liquid drops reach such great speeds (approximately 30 cm/sec.) and such great acceleration values (approximately 100,000 times the acceleration due to gravity) that the individual drops rupture and form particles with diameters of only a few μm. At the same time, however, a very narrow grain spectrum is maintained.

An advantage in the application of ultrasonic waves resides in the high degree of independence of the physical properties (e.g. the viscosity) of the metal salt solution. Now, these properties exert only a slight influence on the size of the broken-down drops, so that, for example, the concentration can be varied within wide ranges.

It was indeed to be expected that the particle size would decrease with increasing frequency; however, it was entirely surprising that, in spite of the small particle size, which was achieved with the ultrasonic atomizer, throughput quantities of at least one liter per hour and atomizer unit could be achieved.

According to the invention, in principle any water-soluble metal salt compound which forms low-solubility compounds with ammonia can be employed as salt of a polyvalent metal. Solutions of divalent, trivalent or tetravalent metals are preferred.

So far as industrial ceramics are concerned, the following metal salt solutions are, for example, of particular interest:

Aluminum solutions (for $Al_2O_3$)
Alumium-titanium solutions (for aluminum titanate)
Aluminum solutions with additives of calcium or magnesium solutions or other known sintering aids Zirconium solutions (for $ZrO_2$) Zirconium solutions with additives of calcium, magnesium or yttrium solutions to influence the crystal structure of zirconium dioxide or any selectable mixtures of these solutions.

However, other metal salt solutions, such as, for example: V, Cr, Mo, W, Mn, Fe, Co and Ni salt solutions, can also be sprayed.

Because of the particularly easy conversion into the oxide, principally organic compounds, such as, for example, acetates or formates or, however, nitrates are particularly suitable as anionic components. Sulfates, carbonates and phosphates are less suitable, because of their high decomposition temperature. Halides, can be sprayed, but, where possible, should not be used, because of their corrosive properties in relation to metal apparatuses.

The concentration of the metal salt solution employed is not critical, and is limited only by the solubility of the salts. Metal salt solutions in concentrations of 0.01 to 1 mol/l can be atomized without any problem. If zirconium salt solutions are used, then the concentration can be increased to 5 mol/l.

In order to increase the BET area and to control the hardness of the agglomerates (this corresponds to the hardness of the spherules after calcination), various additives can be admixed with the solution. These additives are to decompose completely and volatilize on subsequent calcination under oxidizing conditions (atmosphere containing oxygen). It is possible to provide organic, water-soluble, polymeric compounds (e.g PVA, polyacrylamide) as additives.

The upper limit for the concentrations of these additives proved to be 30 g/l in the case of PVA, and 10 g/l in the case of polyacrylamide. Particularly large BET areas are achieved in the case of an addition of 0.1 to 1 g/l PVA, or 0.1 to 1 g/l polyacrylamide.

The process according to the invention is explained in greater detail in the following text, with reference to FIGS. 1 and 2, which show preferred embodiments of the invention FIG. 1 shows a device in which the metal salt solution is broken down into fine droplets by means of an ultrasonic atomizer.

The solution is filled into the storage vessel (1) of the atomization arrangement, and introduced via feed line (2) through a metering device (3) into the atomizer (4). The frequency of the ultrasonic atomizer which is employed determines the droplet size. This should amount to at least 19 kHz. By way of an indicative value, it can be stated that a frequency of 20–40 kHz produces particles having diameters around 100 μm, and a frequency of 1 MHz produces particles having diameters of approximately 10–50 μm. The frequency is regulated by mean frequency generator (5) Since the droplets contain not only the metal ions but also water and "eliminable" anions, the powder particles are in some cases smaller by up to a factor of 3 after conversion into the oxide.

The solution is finely dispersed at the oscillator orifice. In order to ensure a perfect fine dispersion of the solution and in order to avoid the re-formation of larger drops at the ultrasonic oscillator or at the outlet aperture for the solution, the region of the oscillator orifice is flushed with an inert gas which does not react with the sprayed metal salt solutions, e.g. air, nitrogen or argon. The inert gas is expediently introduced through the feed line (6) into a container which is formed of two concentrically disposed tubes (19) and (22), which are connected, on one side, to a planar cover (24). On the other side, the inner tube (19) projects out of the outer tube (22). On this side, the two tube ends are provided with an annular cover (25) tapering conically towards the center of the tube, the inner, circular aperture thereof being larger than the atomizer (4) projecting into it, so that an annular gap (23) is formed. In FIG. 3 an axial projection of the container is shown, with the direction of view from below onto the container. The inert gas fills the outer space (21) formed by the two tubes (19) and (22) and penetrates via inlet apertures (18) into the inner space (20). The inert gas cloud penetrates out of the gap (23), disposed annularly about the atomizer, out of the inner tube (19).

In the fine dispersion zone (7) there is superposed on the inert gas cloud an inert gas laminar flow (10) perpendicular to the plane of fine dispersion, which laminar flow substantially improves the fine dispersion process. In this arrangement, the inert gas passes out of a plurality of apertures (8) in the cover (25) which are rotationally symmetrically disposed about the ultrasonic atomizer (4). The laminar flow ensures that the atomization cloud extends only to a slight extent perpendicular to the direction of flow; moreover, it screens off the atomizer towards the outside and at the same time propels the droplets in the direction of the reaction zone (9), which contains ammonia gas. A few centimeters (approximately 5 cm) below the ultrasonic oscillator, ammonia gas is blown into the reaction vessel (14) radially symmetrically through the feed lines (11). The thorough mixing of the mist of solution droplets and inert gas with ammonia gas causes the droplets to react rapidly with the ammonia. As a result of the heat of reaction which is liberated, this reaction gives rise to a dehydration in the droplets, and thus a conversion into the gel state within a short time (5 to 10 seconds) and over a drop of only of a few centimeters. The rate of conversion is influenced by the temperature in the reaction zone. Since the reaction with the ammonia is an exothermic reaction, a temperature rise is recorded until an equilibrium temperature (approximately 50° C.) is reached. The temperature in the reaction zone (9) can be influenced by cooling or heating (not shown) of the walls of the reaction vessel (14) or of the solution to be sprayed. By reason of their weight, the gel droplets fall into a collecting vessel (12) below the oscillator. This falling of the droplets is assisted by the gas flow, if the latter extends from the fine dispersion zone in the direction of the collecting vessel situated therebelow. The gas leaves the reaction vessel (14) through aperture (13). At room temperature, a drop of 200 mm (oscillator orifice - collecting vessel) is sufficient to obtain solidified spheres.

Figure 2:
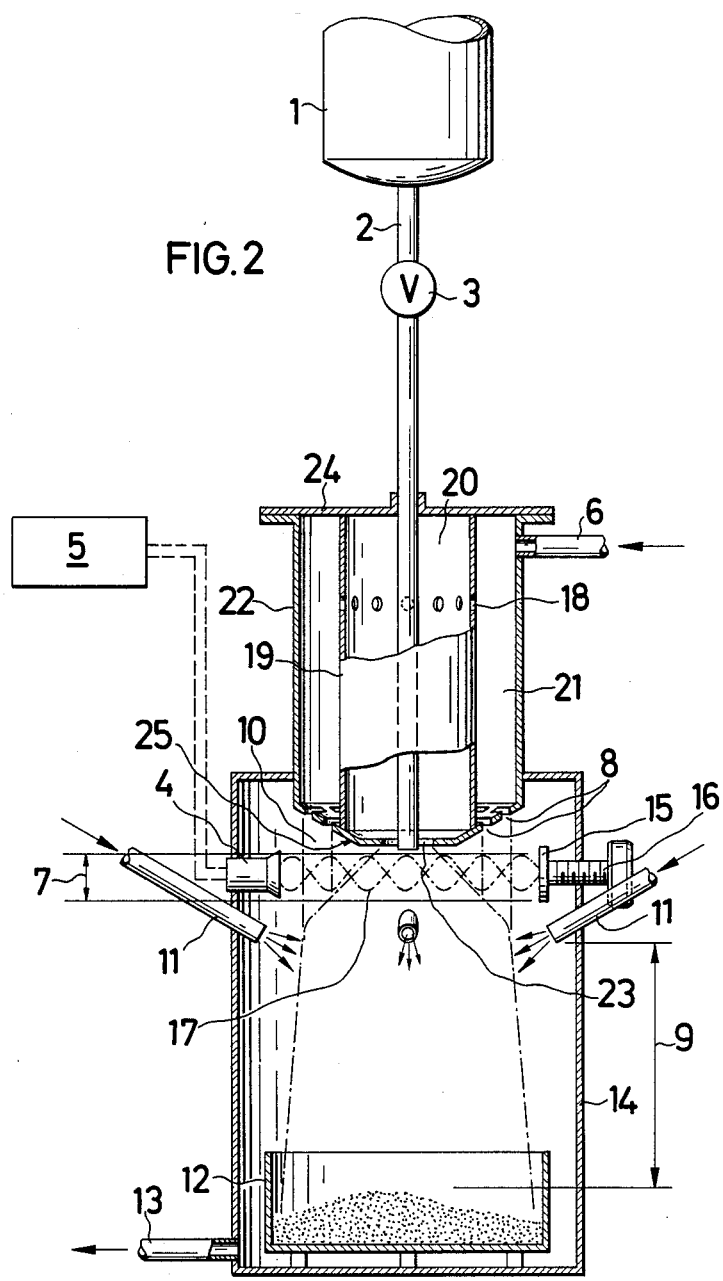
FIG. 2 shows as device in which the metal salt solution is broken down into fine droplets by introduction into a standing ultrasonic wave.

Another preferred embodiment of the invention is shown in FIG. 2. In this case, a standing wave (17) generated by means of ultrasonic waves is used for the atomization. The solution is introduced into the standing wave from the storage vessel (1) through the line (2) via a metering device (3). In a similar way to the above described mode of procedure, the region of the outlet aperture for the metal salt solution is flushed with an inert gas also in the case of liquid atomization by means of a standing wave. The superposition of a laminar flow on the inert gas cloud takes place in a similar way. The standing wave is generated in that the direction of propagation of the ultrasonic waves is chosen to be perpendicular to the direction of flow of the liquid jet and the ultrasonic wave is reflected at a wall (15). Since, in order to generate a standing wave, this must be reflected at a node (phase shift by λ/2), the reflecting wall is disposed so as to be moveable, in order to be able to move it towards or away from the acoustic source (by means of adjusting screw (16)). In practice, the formation of such a standing wave is detected in that the liquid jet is optimally finely dispersed on passing through the acoustic wave. The best results are achieved when the liquid jet is adjusted so that it is broken down in the region of an oscillation antinode, since the acoustic energy is greatest here.

The subsequent processing of the gel spheres determines the agglomerate and powder properties. The first step of the processing of the gel spherules is expediently the washing-out of the ammonium salts from the gel spheres with demineralized or distilled water. If these ammonium salts are readily volatile or readily decomposable salts, then the washing-out can be dispensed with.

This is followed by the drying of the spheres, which can take place, for example, at a temperature of 70°-90° C. and a dwell time of 5-20 hours. The rotary evaporator is particularly suitable for these processing steps. Firstly, the washing process can be carried out more rapidly, and secondly the drying period can be shortened to ½-2 hours. In this process, a homogeneous, almost spherical granulate with good fluidity is obtained. This processing step is followed by the calcination step, in which anionic or organic components which have not been eliminated are driven off and the hydroxides are converted into the oxides. The calcination takes place - if organic components are present - under oxidizing conditions in an atmosphere containing oxygen, preferably at temperatures between 400° and 800° C. and at dwell times of 2-10 hours. However, it can, without further ado, also take place under reducing conditions or under vacuum. If the dried gel spherules contained organic additives, then the calcination temperature determines the BET area of the end products, since the organic components volatilize during the calcination and leave free pores behind. The higher the temperature, the greater is the extent to which the particles are, however, inclined to sinter together further, so that the pore volume and thus the surface decreases. While BET areas of up to 300 $m^2/g$ can be achieved at calcination temperatures of up to 400° C., the BET area values are 10-20 $m^2/g$ at calcination temperatures of a maximum of 800° C.

Surprisingly, the crystallographic high-temperature modifications of $ZrO_2$ and $Al_2O_3$, which can otherwise be prepared only with the expenditure of high energy, may be produced with the process according to the invention. Tetragonal $ZrO_2$ is obtained at a calcination temperature of at least 400° C. A minimum temperature of 600° C. is preferred. A maximum temperature of 800° C. should not be exceeded, because of the small BET area which is then to be expected. A maximum temperature of 750° C., or, even better, 650° C., is preferred. Y-$Al_2O_3$ is obtained at calcination temperatures of at least 200° C. A maximum temperature of 750° C., preferably 500° C., should not be exceeded. In particular, the upper limit of the calcination temperature is at 400° C., or, even better at 300° C.

The invention is explained in greater detail by the following examples.

EXAMPLES

The following examples were carried out in an apparatus according to FIG. 1. However, an apparatus according to FIG. 2 can also be used, with the same success. The selection of the oscillating system (ultrasonic atomizer or standing wave) had no effect on the products which were produced. The oscillating head which was employed had a length of 23 mm and a diameter of 15 mm. (Manufacturer: the company Lechler, Fellbach, Model 100.060.3K). The reaction vessel (14) had a diameter of 300 mm and a height of 350 mm. The collecting vessel had a diameter of 200 mm.

In all examples of implementation, nitrogen was used as inert gas, which flowed through the apparatus at a throughput rate of 1-2 l/h. The ammonia gas throughput was 2-5 l/h.

The gel spherules which were collected were washed with demineralized water and then dried in a rotary evaporator.

EXAMPLE 1

Production of zirconium dioxide powder

An aqueous solution which contained 1 mol/l $Zr(NO_3)_4$ and 30 g/l polyvinyl alcohol (PVA 18/8: manufacturer: Hoechst AG), was sprayed. The liquid throughput was 1 l/h. The washed and dried powder was then calcined for 15 hours at 600° C. in an atmopshere containing oxygen. The resulting zirconium dioxide had a tetragonal crystal structure and a BET area of 22 $m^2/g$. The particle size of the powder was between 10 and 50 μm.

EXAMPLE 2

Production of aluminum oxide

An aqueous solution of aluminum hydroxyacetate ($Al(OH)_2$—($CH_3COO$)) at a concentration of 0.35 mol/l was sprayed at a liquid throughput of 1 l/h. The washed and dried powder was then calcined for 15 hours at 200° C. The Debye Scherrer recordings showed that $Al_2O_3$ was present in the γ modification. The agglomerate size was 30-100 μm. The BET area was approximately 150 $m^2/g$.

EXAMPLE 3

Production of nickel oxide or iron oxide or cobalt oxide

In order to produce the above indicated oxides, aqueous metal salt solutions of $NiSO_4$, $Fe(NO_3)_3$ and $Co(NO_3)_2$ respectively were used at 0.35 mol/l, and were sprayed at a throughput of 1 l/h.

The gel spherules which were produced were washed, dried and subsequently calcined for approximately 20 hours at 100° C. As a consequence of the low calcination temperature, the crystallization of the metal oxides was entirely suppressed, so that X-ray amorphous oxides were formed. The agglomerate size was between 50 and 150 μm, and the BET area values amounted to approximately 230 $m^2/g$.

EXAMPLE 4

Production of lead zirconate

In order to produce lead zirconate, which can be employed as raw material for the piezoceramics, an aqueous solution of 0.35 mol/l lead nitrate ($Pb(NO_3)_2$) and 0.35 mol/l zirconium nitrate ($Zr(NO_3)_4 5H_2O$) was sprayed. The gel spherules which were obtained were washed, dried and then calcined for 15 hours at 600° C. The result was lead zirconate (PbZrO$_3$) with perovskite structure and a BET area of 9.6 m$^2$/g. The agglomerate size was approximately 50 μm.

EXAMPLE 5

Production of aluminum titanate

A 15% by weight aqueous solution consisting of a mixture of one mol of aluminum nitrate (Al(NO$_3$)$_3$) and one mol of titanium(III) chloride (TiCl$_3$) was filled into the storage container of the spraying apparatus. This solution was then sprayed at a liquid throughput of 1 l/h. The washed and dried powder was then calcined for 12 hours at 600° C. By means of powder diffractometry, the structure of aluminum titanate (Al$_2$TiO$_5$) could be established finished product. The BET area was approximately 12 m$^2$/g, and the agglomerate size was 50–100 μm.

EXAMPLE 6

Production of doped zirconium dioxide

In order to produce zirconium dioxide containing yttrium, an aqueous solution of 0.35 mol/l zirconium nitrate (Zr(NO)$_3$)$_4$ 5H$_2$O) and 0.02 mol/l yttrium nitrate (Y (NO$_3$)$_3$.5H$_2$O) was sprayed. The washed and dried powder was calcined at four different temperatures for 20 hours in each instance, and the temperature dependence of the BET areas and of the resultant crystal structure was investigated.

TABLE

| Calcination temperature (°C.) | Crystal structure | BET area (m$^2$/g) | Agglomerate size (μm) |
|---|---|---|---|
| 300 | amorphous | approx. 120 | 50–100 |
| 400 | ZrO$_2$ (t) | n.d. | " |
| 500 | ZrO$_2$(t) + (m) | n.d. | " |
| 600 | ZrO$_2$(t) + (m) | 7.2 | " |

In the above table:
ZrO$_2$(t) indicates tetragonal zirconium dioxide
ZrO$_2$(t)+(m) indicates tetragonal and monoclinic zirconium dioxide
n.d. indicates not determined

I claim:

1. A process for the production of a metal oxide or metal mixed oxide, comprising the steps of:
    applying ultrasonic waves to an aqueous solution of at least one water soluble salt of a polyvalent metal in an inert gas atmosphere to disperse the aqueous solution into droplets;
    passing the droplets through an outlet aperture into a reaction zone where they are brought into contact with a gas containing ammonia to at least partially precipitate the hydroxide of the polyvalent metal in the form of gel spherules which contain metal hydroxide and water; and
    collecting the gel spherules; wherein an inert gas laminar flow oriented parallel to the outlet direction of the aqueous solution is generated radially symmetrically about the outlet aperture for the solution, and the gel spherules are dried and converted, by heating, into the metal oxide or metal mixed oxide.

2. The process as claimed in claim 1, wherein the aqueous solution is divided into droplets by ultrasonic atomizers.

3. The process as claimed in claim 1, wherein the aqueous solution is divided into droplets by introduction into a standing ultrasonic wave.

4. The process as claimed in claim 1, wherein the gel spherules are collected without interposition of a fluid phase.

5. The process as claimed in claim 2, wherein the droplets produced by the ultrasonic atomizer are permitted to fall downwards under the action of gravity, and are then brought into contact with the gas containing ammonia.

6. The process as claimed in claim 1, wherein the aqueous solution contains organic, water soluble polymeric compounds.

7. The process as claimed in claim 1, wherein the dried gel spherules are heated in an atmosphere containing oxygen.

8. The process as claimed in claim 1, wherein the gel spherules are washed with demineralized water.

9. The process as claimed in claim 6, wherein the gel spherules are dried at 70°–90° C.

10. The process as claimed in claim 14, wherein the walls of the reaction vessel are cooled.

11. The process as claimed in claim 14, wherein the walls of the reaction vessel are heated.

12. The process as claimed in claim 1, wherein the aqueous solution to be atomized is cooled.

13. The process as claimed in claim 1, wherein the aqueous solution to be atomized is heated.

14. The process as claimed in claim 1, wherein the process is carried out in a reaction vessel having wells.

15. The process as claimed in claim 1, consisting essentially of the recited steps.

16. The process as claimed in claim 1, wherein the aqueous solution consists essentially of the water soluble salt.

17. The process as claimed in claim 1, wherein the aqueous solution is heated so that a temperature exists in the reaction zone where the salt and the ammonia are in contact, that is higher than an equilibrium reaction temperature of about 50° C.

18. The process as claimed in claim 14, wherein the reactor walls are heated so that a temperature exists in the reaction zone where the salt and the ammonia are in contact, that is higher than an equilibrium reaction temperature of about 50° C.

19. The process as claimed in claim 1, wherein the aqueous solution is cooled so that a temperature exists in the reaction zone where the salt and the ammonia are in contact, that is lower than an equilibrium reaction temperature of about 50° C.

20. The process as claimed in claim 14, wherein the reactor walls are cooled so that a temperature exists in the reaction zone where the salt and the ammonia are in contact, that is lower than an equilibrium reaction temperature of about 50° C.

* * * * *